(12) United States Patent
Thorson

(10) Patent No.: US 8,928,741 B2
(45) Date of Patent: Jan. 6, 2015

(54) 3-D CONTROLLER SYSTEM FOR LEGACY TV

(75) Inventor: Brad Thorson, San Diego, CA (US)

(73) Assignee: Sony Corporation, Tokyo (JP)

(*) Notice: Subject to any disclaimer, the term of this patent is extended or adjusted under 35 U.S.C. 154(b) by 896 days.

(21) Appl. No.: 13/077,707

(22) Filed: Mar. 31, 2011

(65) Prior Publication Data

US 2012/0249759 A1 Oct. 4, 2012

(51) Int. Cl.
*H04N 9/47* (2006.01)
*G02B 27/22* (2006.01)
*H04N 13/04* (2006.01)

(52) U.S. Cl.
CPC ........ *G02B 27/2264* (2013.01); *H04N 13/0425* (2013.01); *H04N 13/0438* (2013.01)
USPC ............................................. 348/56; 348/42

(58) Field of Classification Search
CPC .................... H04N 2213/008; H04N 13/0438; H04N 13/0425; G08B 27/2264
USPC ....................... 348/42, 43, 56, 58; 375/240.12
See application file for complete search history.

(56) References Cited

U.S. PATENT DOCUMENTS

| | | | |
|---|---|---|---|
| 6,456,432 B1 | 9/2002 | Lazzaro et al. | |
| 2003/0147466 A1* | 8/2003 | Liang | 375/240.12 |
| 2010/0118128 A1 | 5/2010 | Choi | |
| 2010/0194857 A1* | 8/2010 | Mentz et al. | 348/43 |
| 2010/0225751 A1* | 9/2010 | Nemeth | 348/58 |
| 2011/0001808 A1 | 1/2011 | Mentz | |

FOREIGN PATENT DOCUMENTS

| | | |
|---|---|---|
| CN | 101727807 A | 6/2010 |
| CN | 201623818 U | 11/2010 |
| CN | 101945298 A | 1/2011 |
| CN | 101950542 A | 1/2011 |
| CN | 101963704 A | 2/2011 |
| WO | 2010141514 A2 | 12/2010 |

OTHER PUBLICATIONS

Mitsubishi Electric—3D Adapter brochure—downloaded from the internet on Jul. 7, 2010 from http://www.mitsubishi-tv.com/pdf/3da1%20SpecSheet060810.pdf, 2 pages.
State Intellectual Property Office of the People's Republic of China, office action issued on Dec. 20, 2014 for corresponding Chinese Patent Application No. 201210038538.2, the office action translated in English (pp. 1-6); original office action in Chinese (pp. 7-15), and pending claims (pp. 16-19) pp. 1-19.
State Intellectual Property Office of the PRC, second Office Action issued on Jun. 13, 2014 for corresponding Chinese Patent application No. 201210038538.2, English translation (pp. 1-6), original Office Action in Chinese (pp. 7-16) and pending claims (pp. 17-19) pp. 1-19.

* cited by examiner

*Primary Examiner* — Allen Wong
(74) *Attorney, Agent, or Firm* — John P. O'Banion

(57) ABSTRACT

An apparatus for operating a pair of 3-D glasses to view a 3-D video signal on a TV. The apparatus includes a controller having an input for receiving a 3-D video data stream from a video source, an output for delivering a portion of the 3-D video data stream as a video signal to be displayed on the TV, synchronization programming for reading the 3-D video data stream and obtaining 3-D commands relating to said 3-D video data and a transmitter for wireless transmitting the 3-D commands. The system further includes 3-D glasses having a receiver configured to receive the 3-D command signal, left and right shutters configured to selectively close and open according to the 3-D commands, and a control input configured to calibrate the glasses to the displayed video signal of the TV.

15 Claims, 3 Drawing Sheets

3-D CONTROLLER SYSTEM FOR LEGACY TV

CROSS-REFERENCE TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND OF THE INVENTION

1. Field of the Invention

This invention pertains generally to gesture recognition, and more particularly to gesture recognition for remote controls.

2. Description of Related Art

Consumers purchasing many high-end televisions may be dissatisfied by a lack of compatibility with active 3-dimension (3-D) glasses, which may cause more adoption of passive 3-D technology in the home. One of the largest challenges posed by active 3-D glasses is calibrating them to be used with a set a particular TV display. The 3-D glasses generally need to respond to signals from an IR controller. Generally, the preferred way to control 3-D glasses is to measure the latency from a point in the signal stream to the screen itself. Once this latency is known, the glasses can be controlled by an external IR adaptor.

Accordingly, an object of the present invention is to provide a controller to operate active 3-D glasses with a legacy TV. At least some of these objections will be met in the following description.

BRIEF SUMMARY OF THE INVENTION

The present invention comprises a controller system and method to control the 3-D glasses used for the legacy TVs. The system includes a video switch, connected by HDMI cables between source devices and the television that can be used to control active 3-D glasses. 3-D glasses are used to view an image on a user's TV. Using an input, users may adjust the latency (delay) between infrared (IR) control and screen output for the 3-D glasses control. Once set, users are able to enjoy 3-D content without having a 3-D specific TV.

By providing users with a 240 Hz 3-D calibration screen, the device of the present invention may be configured to allow users to set the latency between IR control and screen output, allowing users to use a TV manufactured before 2010 with 240 Hz processing and potentially 120 Hz TV's as well with active 3-D glasses.

Users may wear 3-D glasses and view an image on their TV, using an input, they will adjust the delay for the 3-D glasses control, once set, they will be able to enjoy 3-D content.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

DETAILED DESCRIPTION OF THE INVENTION

Referring more specifically to the drawings, for illustrative purposes the present invention is embodied in the apparatus generally shown in FIG. 1 through FIG. 4. It will be appreciated that the apparatus may vary as to configuration and as to details of the parts, and that the method may vary as to the specific steps and sequence, without departing from the basic concepts as disclosed herein.

Figure 1:
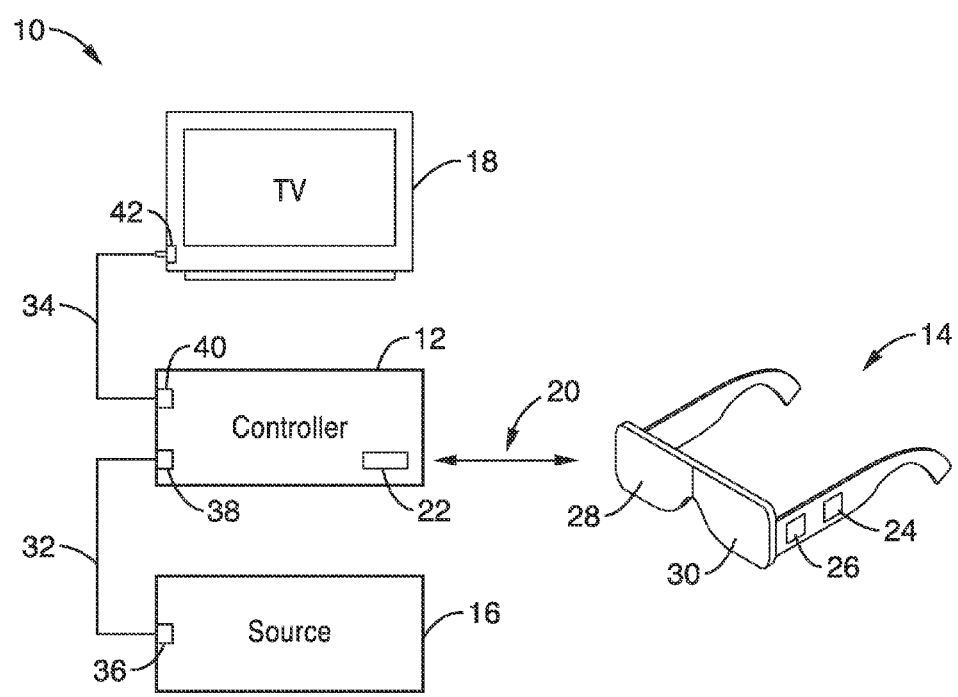
FIG. 1 is a schematic diagram of a 3-D controller coupled to a TV and video source in accordance with the present invention.

FIG. 1 is a schematic diagram of a 3-D display system 10 having a controller 12 coupled between a TV 18 and video source 16 in accordance with the present invention.

TV 18 will generally comprise a legacy TV that is not enabled to interact with a 3-D vision device. TV 18 generally comprises an HDMI or similar input 42 configured to receive an HDMI cable 34. Controller 12 may be configured to operate with one or more different types of TV displays, including, but not limited to LCD, LED, plasma, CRT displays.

The controller 12 comprises an input 38 configured to intercept/receive a video signal from a source device 16 (e.g. via an HDMI or like cable 32 that receives the signal from output 36 of the device). Source device 16 may comprise any device that is configured for outputting a video signal with a 3-D data component for use with active 3-D glasses, e.g. a Blu-ray player, HD enabled set-top-box (STB), game console, computer, or like device.

The controller is configured to receive said 3-D data component and correspondingly send a signal via IR transceiver 22 to a pair of glasses 14. Human vision is capable of realizing a three-dimensional profile of an object due to different viewing angles of the two eyes. In this regard, the three-dimensional image input to the display 18 is separated into a left eye image and a right eye image, which are alternately input. Correspondingly, shutter-type glasses 14 have a receiver/ transceiver 26 configured to receive said signal 20 to manipulate right and left shutters 28, 30 to correspond with the output of the display 18.

Figure 2:
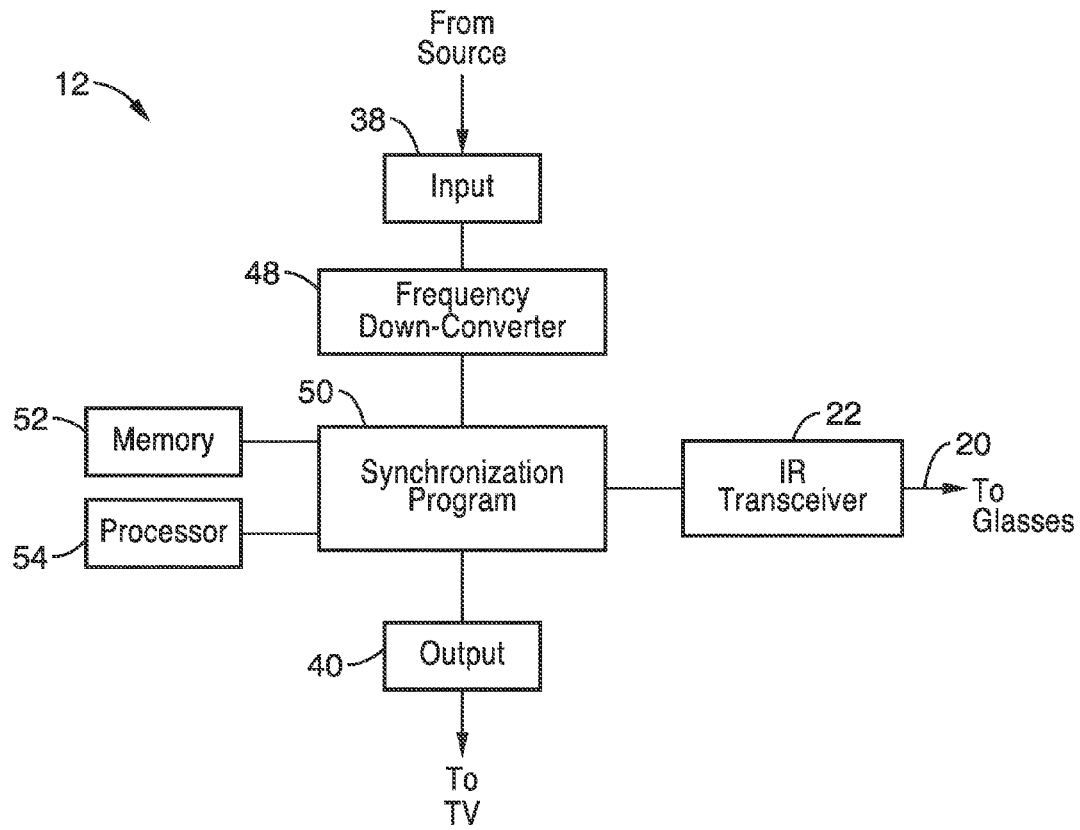
FIG. 2 illustrates a schematic diagram of the 3-D controller of FIG. 1.

FIG. 2 illustrates a schematic diagram of the 3-D controller 12 of system 10. Preferably, the controller 12 is configured to work with 60 Hz TV's, or reconcile the data from the 3-D source to the desired TV input frequency. A frequency down-converter 14 is included that is configured to take a 240 Hz 3-D signal from the source (e.g. Blu-Ray player, etc.) and down-convert to a 30 Hz signal to the left eye and a 30 Hz signal to the right eye (e.g. shutters 28 and 30 in FIG. 3). This would allow for any legacy TV to become an active glasses 3-D TV, and support the adoption of 3-D content. Essentially, the converter 12 would be displaying every 4th frame from each half of the 3d signal.

The controller 12 comprises synchronization programming 50 that received the video signal from the converted data from down converter 48 and input 38. The synchronization programming 50 and down-converter programming 48 may be stored in memory 52 and be operated by processor 54 to read the input video signal and simultaneously obtain instructions from the 3-D data component/stream while outputting the video signal to be displayed via output 40. The instructions from the 3-D data component/stream are sent via the IR transceiver 22 as command signal 20.

Figure 3:
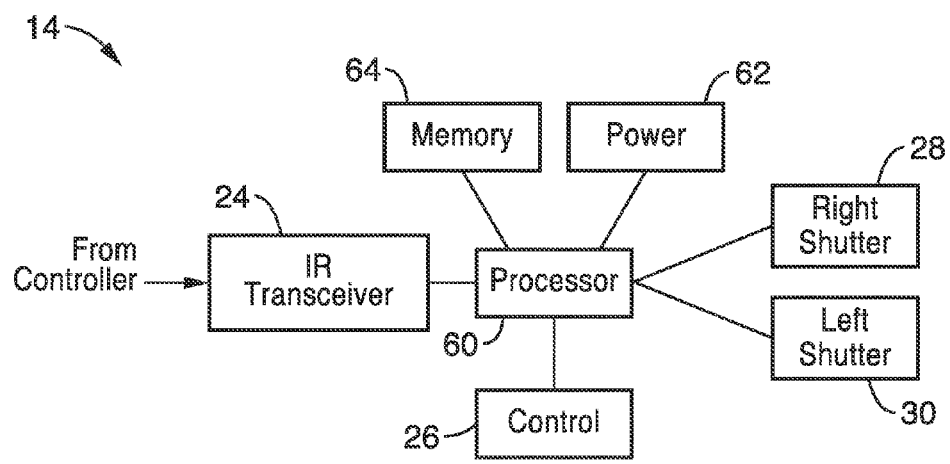
FIG. 3 illustrates a schematic diagram of the 3-D glasses of FIG. 1.

FIG. 3 illustrates a schematic diagram of the 3-D glasses 14 of system 10 in accordance with the present invention. Glasses 14 preferably comprise shutter-type glasses that are configured to interface with display 18 and be selectively opened or closed according to whether the left eye image or the right eye image is displayed in the display 18 while a user wears the shutter-type glasses 14. In particular, a view of the left eye is enabled by opening left shutter 30 when displaying the left eye image, while a view of the right eye is enabled by opening right shutter 28 when displaying the right eye image. Thus, a user can recognize a solid body from the three-dimensional image.

Accordingly, the shutter glasses 14 may comprise a processor 60 (and associated programming stored in memory 64), for receiving command signal 20 via IR receiver 24, and using the signal 20 to sequentially presenting to the left eye of a viewer, the left image (of a stereo pair) displayed on the screen 18 during left image display period, and thereafter, present the right image of the viewer the right image of the stereo pair displayed during right image display period. Over the left and right display periods, the perceived left and right images fuse to provide the 3-D image in the mind of the viewer.

The function of the shutters 28, 30 is to sequentially undergo a change in optical state during the left and right image display periods, to allow the viewer stereoscopically view sequentially displayed stereoscopic pairs. This function is carried out by electrically switching the optical state of the shutters 28, 30 in response to trigger signals 20 derived from the original output video signal from source 16. In particular, at the beginning of the left image display period, the optical state of the left eye shutter 30 is synchronously switched from its opaque state to its transparent state and the optical state of the right eye shutter 28 is synchronously switched from its transparent state to its opaque state. Then, at the beginning of the right image display period, the optical state of the right eye shutter 28 is synchronously changed from its opaque state to its transparent state and the optical state of the left eye shutter 30 is synchronously changed from its transparent state to its opaque state. Such synchronously switching operations require the generation of trigger (i.e. switching) signals for driving the operations of the LCD shutters.

The 3-D glasses 14 preferably comprise a control input 26 on the glasses at a location that is accessible to the user. Control input 26 allows for measurement of the latency from a point in the digital signal stream to the screen itself. Once this latency is found, the glasses can be controlled by the controller 12. The control input 26 may comprise a dial or series of buttons disposed on a location on the 3-D glasses 14. The control 26 allows the 3-D glasses 14 to be calibrated by the user as the user is viewing the screen to adjust or calibrate the 3-D glasses in real time according to the latency of the digital signal stream.

Controller 12 is preferably configured to operate with 240 Hz processing, however, may also be able to operate at 120 Hz.

Figure 4:
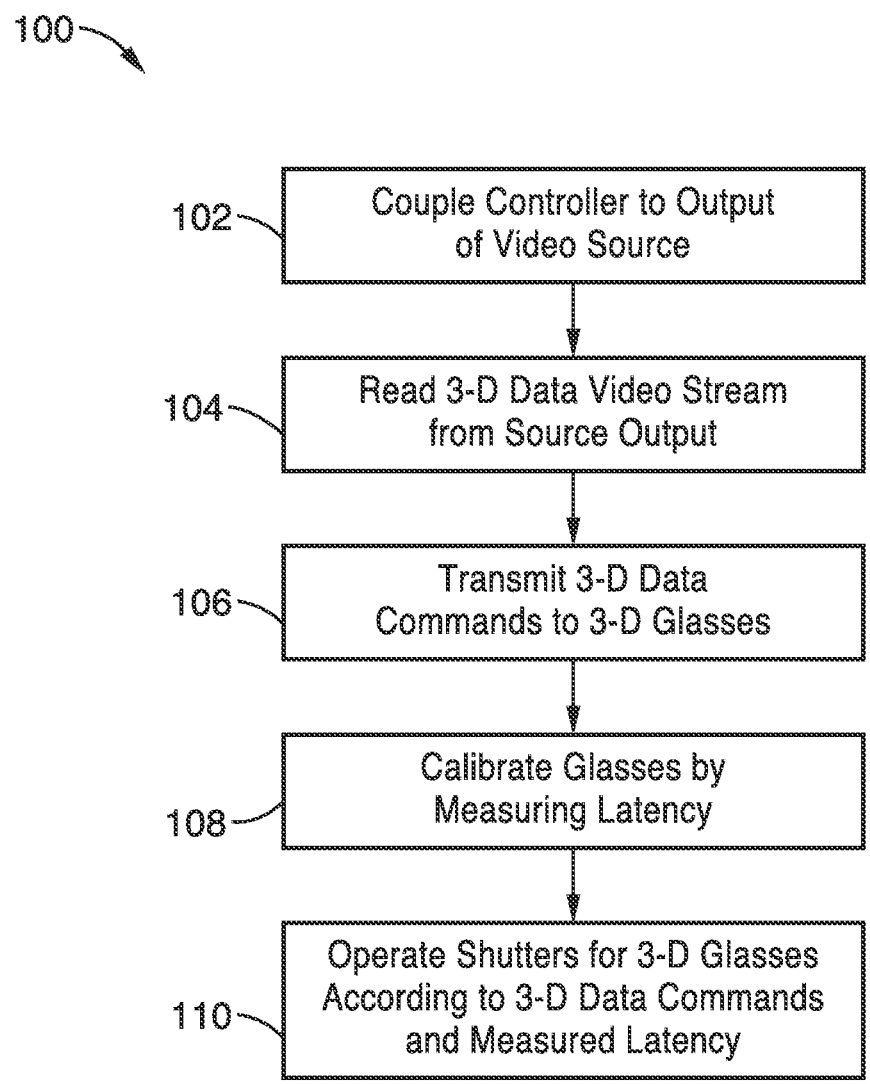
FIG. 4 shows a method of controlling in a pair of 3-D glasses in accordance with the present invention.

FIG. 4 shows a method 100 for controlling in a pair of 3-D glasses in accordance with the present invention. Method 100 may be performed via execution of synchronization program 50 on processor 54.

In the first block 102, the controller 12 is coupled to the output 36 of a video source, and correspondingly coupled to an input 42 of TV 18.

Next, the 3-D data stream from the source output 36 is received/read at block 104.

At Block 106, the portion of the 3-D data stream relating to control of 3-D glasses is then transmitted wirelessly to the 3-D glasses 14 via a series of commands sent through the transmitter 22 and receiver 24. Simultaneously, the video signal is sent to the TV 18 for display of the video. It is appreciated the input signal may be down-converted to the desired input frequency before sending commands to the glasses at step 106.

While the user is viewing the displayed video on TV 18 wearing the 3-D glasses 14, the user then calibrates the glasses 14 by measuring the latency of the 3-D data stream with control input 26 at block 108.

The shutters 28, 30 are then operated according to the latency-adjusted 3-D data commands to affect the 3-D visualization of the video at block 110.

Because consumers may have multiple devices that will be providing 3-D signals, the controller 12 may also comprise an integrated video switch (not shown) for switching between multiple inputs (not shown) of the video source devices (e.g. the controller may switch between the input of one or more of a STB, Blu-ray player, computer, amplifier, or other device capable of delivering a 3-D video signal).

It is also appreciated that the controller may be integrated with or part of a 3-D video source device. For example, the controller may be a component within a Blu-ray player, or like device.

The controller 12 of the present invention may also comprise an optical sensor (not shown) positioned at a location in the room looking at the TV 18, or as a device connected to a video output from the TV 18. Both these implementations would remove the need for a video switch. In this configuration, there would be a feedback loop between glasses and emitter that would allow for the software to perform the calibration automatically. The sensor would need to be both a receiver and a sensor.

Embodiments of the present invention are described with reference to flowchart illustrations of methods and systems according to embodiments of the invention. These methods and systems can also be implemented as computer program products. In this regard, each block or step of a flowchart, and combinations of blocks (and/or steps) in a flowchart, can be implemented by various means, such as hardware, firmware, and/or software including one or more computer program instructions embodied in computer-readable program code logic. As will be appreciated, any such computer program instructions may be loaded onto a computer, including without limitation a general purpose computer or special purpose computer, or other programmable processing apparatus to produce a machine, such that the computer program instructions which execute on the computer or other programmable processing apparatus create means for implementing the functions specified in the block(s) of the flowchart(s).

Accordingly, blocks of the flowcharts support combinations of means for performing the specified functions, combinations of steps for performing the specified functions, and computer program instructions, such as embodied in computer-readable program code logic means, for performing the specified functions. It will also be understood that each block of the flowchart illustrations, and combinations of blocks in the flowchart illustrations, can be implemented by special purpose hardware-based computer systems which perform the specified functions or steps, or combinations of special purpose hardware and computer-readable program code logic means.

Furthermore, these computer program instructions, such as embodied in computer-readable program code logic, may also be stored in a computer-readable memory that can direct a computer or other programmable processing apparatus to function in a particular manner, such that the instructions stored in the computer-readable memory produce an article of manufacture including instruction means which implement the function specified in the block(s) of the flowchart(s). The computer program instructions may also be loaded onto a computer or other programmable processing apparatus to cause a series of operational steps to be performed on the computer or other programmable processing apparatus to produce a computer-implemented process such that the instructions which execute on the computer or other programmable processing apparatus provide steps for implementing the functions specified in the block(s) of the flowchart(s).

As can be seen, therefore, the present invention includes the following inventive embodiments among others:

1. A system for viewing 3-D video on a TV, comprising: (a) a controller, comprising: an input for receiving a 3-D video data stream from a video source; an output for delivering a portion of the 3-D video data stream as a video signal to be displayed on the TV; synchronization programming for reading the 3-D video data stream and obtaining 3-D commands relating to said 3-D video data; and a transmitter for wireless transmitting the 3-D commands; and (b) 3-D glasses, comprising: a receiver configured to receive the 3-D commands; and left and right shutters configured to selectively close and open according to said 3-D commands.

2. The system of embodiment 1, wherein the TV comprises a legacy TV.

3. The system of embodiment 1, wherein the 3-D glasses further comprise a control input configured to calibrate the glasses to the displayed video signal.

4. The system of embodiment 3, wherein the control input is configured to measure the latency from a point in the 3-D data stream to the displayed video signal.

5. The system of embodiment 4, wherein the control input is configured to be manually manipulated by a user.

6. The system of embodiment 1, wherein the transmitter and receiver are configured to operate with IR signals.

7. The system of embodiment 1, wherein the controller comprises a switch configured to receive input from a plurality of video sources.

8. An apparatus for operating a pair of 3-D glasses to view a 3-D video signal on a TV, comprising: (a) a controller, comprising: an input for receiving a 3-D video data stream from a video source; an output for delivering a portion of the 3-D video data stream to a TV input as a video signal to be displayed on the TV; synchronization programming for reading the 3-D video data stream and obtaining 3-D commands relating to said 3-D video data; and a transmitter for wireless transmitting the 3-D commands; and (b) 3-D glasses, comprising: a receiver configured to receive the 3-D commands; left and right shutters configured to selectively close and open according to said 3-D commands; and a control input configured to calibrate the glasses to the displayed video signal of the TV.

9. The apparatus of embodiment 8, wherein the TV comprises a legacy TV.

10. The apparatus of embodiment 8, wherein the control input is configured to measure the latency from a point in the 3-D data stream to the displayed video signal.

11. The apparatus of embodiment 10, wherein the control input is configured to be manually manipulated by a user.

12. The apparatus of embodiment 10: wherein the control input is located on the 3-D glasses at a location accessible to the user; and wherein the control input is configured to calibrate the 3-D glasses in real time while viewing the video signal with the glasses.

13. The apparatus of embodiment 8, wherein the transmitter and receiver are configured to operate with IR signals.

14. The apparatus of embodiment 8, wherein the controller comprises a switch configured to receive input from a plurality of video sources.

15. A method for operating a pair of 3-D glasses to view a 3-D video signal on a TV, comprising: coupling a controller to an output of a video source; receiving a 3-D video data stream from the video source; outputting a portion of the 3-D video data stream as a video signal to be displayed on the TV; obtaining 3-D commands from the 3-D video data stream, the 3-D commands relating to said 3-D video data; wirelessly transmitting the 3-D commands; receiving the 3-D command signal at a pair of 3-D glasses; and operating the 3-D glasses according to the received 3-D command signal.

16. The method of embodiment 15, wherein the 3-D glasses comprise left and right shutters configured to selectively close and open according to said 3-D commands.

17. The method of embodiment 16, further comprising: manipulating a control input at the glasses; the control input configured to calibrate the glasses to the displayed video signal of the TV.

18. The method of embodiment 15, wherein the TV comprises a legacy TV.

19. The method of embodiment 17, wherein calibrating the glasses comprises measuring the latency from a point in the 3-D data stream to the displayed video signal.

20. The method of embodiment 17, wherein the control input is manually manipulated by a user.

21. The method of embodiment 20: wherein the control input is located on the 3-D glasses at a location accessible to the user; and wherein calibrating the 3-D glasses is performed in real time while the user views the video signal with the 3-D glasses.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A system for viewing 3-D video on a legacy TV, comprising:
   (a) a controller, comprising:
      an input for receiving a 3-D video data stream from a video source;
      an output for delivering a portion of the 3-D video data stream as a video signal to be displayed on a legacy TV;
      synchronization programming for reading the 3-D video data stream and obtaining 3-D commands relating to said 3-D video data; and
      a transmitter for wireless transmitting the 3-D commands; and
   (b) 3-D glasses, comprising:
      a receiver configured to receive the 3-D commands;
      left and right shutters configured to selectively close and open according to said 3-D commands; and
      a control input configured to measure the latency from a point in the 3-D data stream to the displayed video signal and calibrate the glasses as a function of the measured latency.

2. A system as recited in claim 1, wherein the control input is configured to be manually manipulated by a user.

3. A system as recited in claim 1, wherein the transmitter and receiver are configured to operate with IR signals.

4. A system as recited in claim 1, wherein the controller comprises a switch configured to receive input from a plurality of video sources.

5. An apparatus for operating a pair of 3-D glasses to view a 3-D video signal on a legacy TV, comprising:
   (a) a controller, comprising:
      an input for receiving a 3-D video data stream from a video source;
      an output for delivering a portion of the 3-D video data stream to a TV input as a video signal to be displayed on the TV;
      synchronization programming for reading the 3-D video data stream and obtaining 3-D commands relating to said 3-D video data; and
      a transmitter for wireless transmitting the 3-D commands; and
   (b) 3-D glasses, comprising:
      a receiver configured to receive the 3-D commands;
      left and right shutters configured to selectively close and open according to said 3-D commands; and
      a control input configured to measure the latency from a point in the 3-D data stream to the displayed video signal and calibrate the glasses as a function of the measured latency.

6. An apparatus as recited in claim 5, wherein the control input is configured to be manually manipulated by a user.

7. An apparatus as recited in claim 5:
   wherein the control input is located on the 3-D glasses at a location accessible to the user; and
   wherein the control input is configured to calibrate the 3-D glasses in real time while viewing the video signal with the glasses.

8. An apparatus as recited in claim 5, wherein the transmitter and receiver are configured to operate with IR signals.

9. An apparatus as recited in claim 5, wherein the controller comprises a switch configured to receive input from a plurality of video sources.

10. A method for operating a pair of 3-D glasses to view a 3-D video signal on a TV, comprising:
    coupling a controller to an output of a video source;
    receiving a 3-D video data stream from the video source;
    outputting a portion of the 3-D video data stream as a video signal to be displayed on the TV;
    obtaining 3-D commands from the 3-D video data stream, the 3-D commands relating to said 3-D video data;
    wirelessly transmitting the 3-D commands;
    receiving the 3-D command signal at a pair of 3-D glasses;
    operating the 3-D glasses according to the received 3-D command signal;
    measuring the latency from a point in the 3-D data stream to the displayed video signal; and
    calibrating the glasses as a function of the measured latency.

11. A method as recited in claim 10, wherein the 3-D glasses comprise left and right shutters configured to selectively close and open according to said 3-D commands.

12. A method as recited in claim 11, further comprising:
    manipulating a control input at the glasses;
    the control input configured to calibrate the glasses to the displayed video signal of the TV.

13. A method as recited in claim 12, wherein the control input is manually manipulated by a user.

14. A method as recited in claim 13:
    wherein the control input is located on the 3-D glasses at a location accessible to the user; and
    wherein calibrating the 3-D glasses is performed in real time while the user views the video signal with the 3-D glasses.

15. A method as recited in claim 10, wherein the TV comprises a legacy TV.

* * * * *